(12) United States Patent
Schelstraete et al.

(10) Patent No.: US 8,989,239 B2
(45) Date of Patent: Mar. 24, 2015

(54) SYSTEMS AND METHODS FOR RETRANSMISSION WITH ON-LINE RECONFIGURATION

(75) Inventors: Sigurd Schelstraete, Menlo Park, CA (US); Massimo Sorbara, Freehold, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 922 days.

(21) Appl. No.: 13/103,063

(22) Filed: May 7, 2011

(65) Prior Publication Data

US 2011/0274147 A1 Nov. 10, 2011

Related U.S. Application Data

(60) Provisional application No. 61/333,015, filed on May 10, 2010.

(51) Int. Cl.
*H04B 1/38* (2006.01)
*H04L 1/18* (2006.01)

(52) U.S. Cl.
CPC .................................. *H04L 1/1887* (2013.01)
USPC .......................................... 375/219; 375/220

(58) Field of Classification Search
CPC ... H04L 1/1812; H04L 1/0009; H04L 1/0019; H04L 1/1816; H04L 1/1819; H04L 27/2601; H04L 2001/0097; H04L 1/1887; H04L 5/0007
USPC .................. 375/219, 147; 714/709, 748, 751; 370/352
See application file for complete search history.

(56) References Cited

U.S. PATENT DOCUMENTS

2002/0172188 A1 11/2002 Wunsh
2002/0191682 A1 12/2002 Moon
2004/0114574 A1 6/2004 Zeira et al.
(Continued)

FOREIGN PATENT DOCUMENTS

EP 1816776 A1 8/2007

OTHER PUBLICATIONS

ITU-T G.998.4, "Improved Impulse Noise Protection (INP) for DSL Transceivers," Series G: Transmission Systems and Media, Digital Systems and Networks, International Telecommunication Union, Jun. 2010.
(Continued)

*Primary Examiner* — Daniel Washburn
*Assistant Examiner* — Fitwi Hailegiorgis
(74) *Attorney, Agent, or Firm* — Pillsbury Winthrop Shaw Pittman LLP (57) ABSTRACT

Disclosed are various embodiments for performing retransmission with on-line reconfiguration. A data stream is encoded into first frames according to a framing configuration. A request is obtained for an on-line reconfiguration of the framing configuration from a receiver. The encoding of the data stream into the first frames is suspended in response to the request. One or more first frames are retransmitted to the receiver during a retransmission time period that commences relative to the suspending of the encoding of the data stream into the first frames. The encoding of the data stream into second frames is resumed according to a modified framing configuration consistent with the on-line reconfiguration. The second frames are transmitted to the receiver upon expiration of the retransmission time period.

27 Claims, 6 Drawing Sheets

(56) References Cited

U.S. PATENT DOCUMENTS

| | | |
|---|---|---|
| 2005/0190826 A1 | 9/2005 | Van Bruyssel et al. |
| 2006/0176942 A1 | 8/2006 | Oksman et al. |
| 2007/0106924 A1 | 5/2007 | Seidel et al. |
| 2008/0043624 A1 | 2/2008 | Matza |
| 2008/0260011 A1 | 10/2008 | Peeters et al. |
| 2009/0177938 A1* | 7/2009 | Pons et al. .................. 714/751 |
| 2009/0249133 A1 | 10/2009 | Pons et al. |
| 2009/0323903 A1 | 12/2009 | Cioffi et al. |

OTHER PUBLICATIONS

International Search Report and Written Opinion for PCT/US2011/035729 issued Aug. 31, 2011.

* cited by examiner

SYSTEMS AND METHODS FOR RETRANSMISSION WITH ON-LINE RECONFIGURATION

CROSS-REFERENCE TO RELATED APPLICATION

This application claims priority to, and the benefit of, U.S. Provisional Patent Application entitled, "Retransmission with OLR," having Ser. No. 61/333,015, filed on May 10, 2010, which is incorporated by reference in its entirety.

TECHNICAL FIELD

The present disclosure generally relates to digital subscriber line systems and particularly, to systems and methods for retransmission with on-line reconfiguration.

BACKGROUND

In digital subscriber line (xDSL) systems such as asymmetric digital subscriber line (ADSL) and very-high-bitrate digital subscriber line (VDSL) systems, retransmission (ReTx) can be optionally utilized for ensuring quality of transmission for latency-insensitive data, such as video. Retransmission at the physical layer (PHY) may provide improved impulse noise protection over merely using forward error correction, interleaving, and/or other approaches. The retransmission scheme used in xDSL systems supports both asynchronous transfer mode (ATM) and packet transfer mode (PTM) protocols and has been designed such that elementary frames that can be retransmitted are formed in the physical layer. Generally, for ADSL systems, it has been proposed that retransmission be implemented only in the downstream direction, whereas for VDSL systems, retransmission may either be implemented in strictly the downstream direction or in both the downstream and upstream directions.

Generally, a transmitter that supports a retransmission scheme includes a retransmission queue for storing elementary frames in order to have access to previously-sent elementary frames in the event that a request for retransmission is received. A request for retransmission is contained in a retransmission return channel (RRC) message, which contains information on which elementary frames have been correctly and/or incorrectly received, and hence identify the frames that need to be retransmitted. RRC messages are transported over the retransmission return channel. A receiver that supports retransmission will typically include a frame error detector, a rescheduling queue, and a retransmission request encoder. The frame error detector detects the correctness of each received frame. The rescheduling queue re-sequences elementary frames in the event that correctly received elementary frames are received out of order due to retransmission. The request encoder converts the decisions of the frame error detector into a RRC message, which can be understood by the transmitter side. A protocol for performing retransmission is provided in the G.998.4 recommendation. However, the G.998.4 recommendation does not support on-line reconfiguration resulting in data rate change.

SUMMARY

Briefly described, one embodiment, among others, is a method implemented in a transmitter of a digital subscriber line (DSL) system. The method comprises encoding a data stream into a plurality of first frames according to a framing configuration. The method further comprises obtaining a request for an on-line reconfiguration of the framing configuration from a receiver. The method further comprises suspending the encoding of the data stream into the first frames in response to the request. The method further comprises retransmitting at least one of the first frames to the receiver during a retransmission time period that commences relative to the suspending of the encoding of the data stream into the first frames. The method further comprises resuming the encoding of the data stream into a plurality of second frames according to a modified framing configuration consistent with the on-line reconfiguration. The method further comprises transmitting the second frames to the receiver upon expiration of the retransmission time period.

Another embodiment is a system. The system comprises a transmitter for transmitting a data stream over a communications channel to a receiver. The transmitter comprises a framing encoder configured to encode the data stream into a plurality of frames according to a framing configuration. The transmitter further comprises reconfiguration logic that performs an on-line reconfiguration of the communications channel. The reconfiguration logic comprises logic that suspends operation of the framing encoder according to the framing configuration. The reconfiguration logic further comprises logic that enables retransmission of at least one of the frames encoded according to the framing configuration during a retransmission state that commences relative to the operation of the framing encoder being suspended. The reconfiguration logic further comprises logic that resumes operation of the framing encoder according to a modified framing configuration consistent with the on-line reconfiguration. The reconfiguration logic further comprises logic that disables transmission of frames encoded according to the modified framing configuration until the retransmission state ends.

Another embodiment is a system. The system comprises a receiver for receiving a data stream over a communications channel from a transmitter. The receiver comprises logic that transmits a request for an on-line reconfiguration of the communications channel to the transmitter. The receiver further comprises logic that obtains at least one retransmitted frame of the data stream from the transmitter after the request is transmitted. The retransmitted frame(s) are framed according to a first framing configuration. The receiver further comprises logic that obtains an indication signifying that an on-line reconfiguration is to take effect in a predefined number of discrete multi-tone (DMT) symbols. No initially transmitted frames of the data stream are obtained before the on-line reconfiguration takes effect after obtaining the indication. The receiver further comprises logic that obtains at least one frame of the data stream from the transmitter when the on-line reconfiguration takes effect. The frame(s) are constructed according to a second framing configuration that is consistent with the on-line reconfiguration.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Various embodiments disclosed herein relate to enabling on-line reconfiguration of parameters in an xDSL system along with retransmission of data for improved impulse noise protection. Such systems may include ADSL2 systems according to the G.992.3 recommendation, ADSL2plus systems according to the G.992.5 recommendation, VDSL2 systems according to the G.993.2 recommendation, and/or other systems. On-line reconfiguration facilitates various changes to the framing parameters in an xDSL system during Showtime without interruption of service and without causing errors due to lost data transmission units (DTUs).

Techniques of on-line reconfiguration include seamless-rate adaptation (SRA) and emergency rate reduction (SOS), which allow for data transfer rate changes. However, when framing parameters change, previously stored data cannot be retransmitted because the previously stored data does not comply with the new framing parameters. Dropping the previously stored data would be unacceptable because the data previously sent may not have been correctly received by the receiver. Thus, dropping the previously stored data would introduce a probability of error when an on-line reconfiguration is performed. The various embodiments disclosed herein are configured to retransmit the previously stored data before transmitting new data encoded with the new framing parameters. The data encoded with the old framing parameters are not retransmitted after the on-line reconfiguration is complete.

Figure 1:
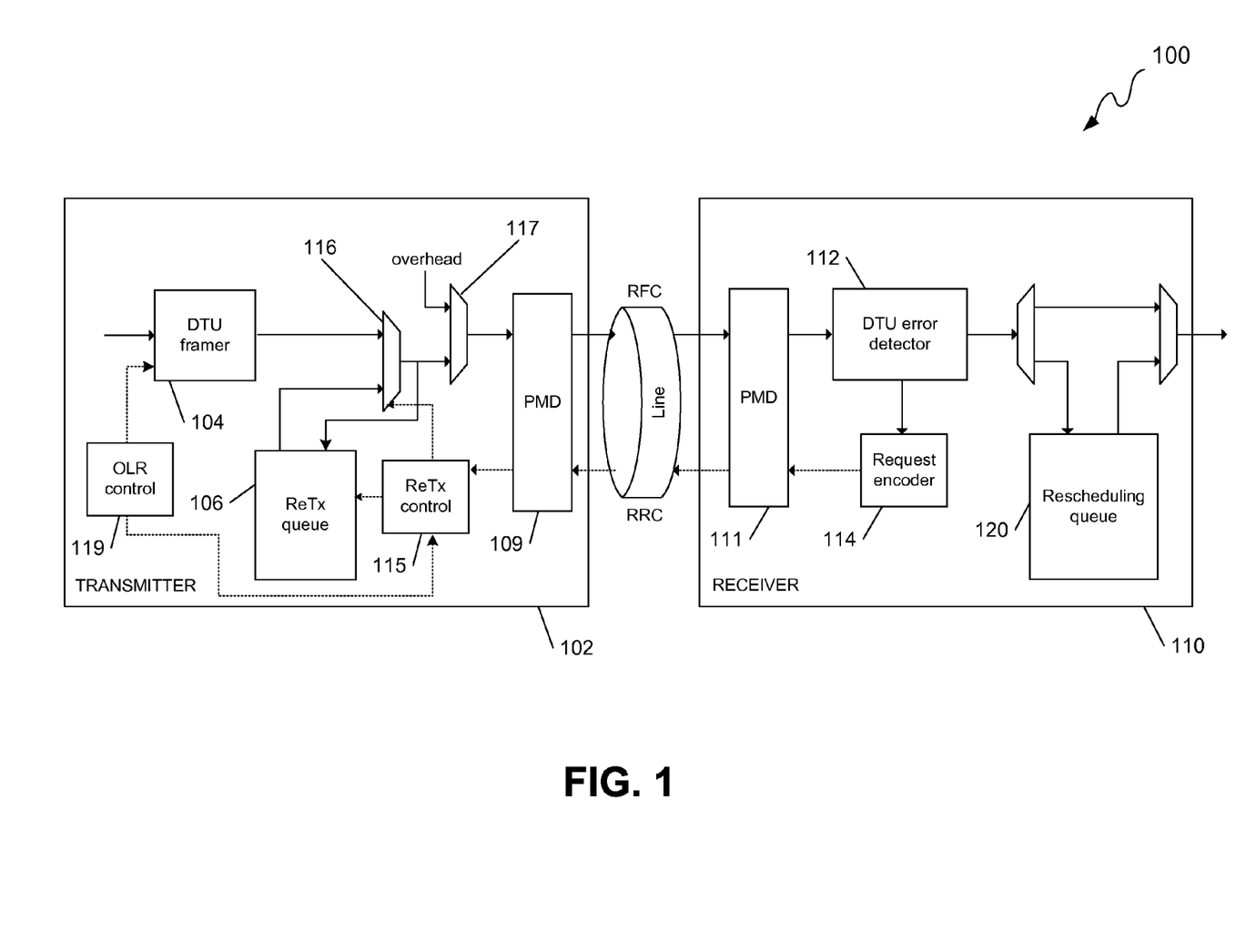
FIG. 1 depicts a functional block diagram of an embodiment for a single link retransmission system.

Reference is made to FIG. 1, which depicts a functional block diagram of a single link retransmission system 100 in which embodiments of retransmission with on-line reconfiguration may be implemented. The system 100 comprises a transmitter 102, which comprises a DTU framer 104 configured to construct elementary frames, or DTUs, from a data stream. The DTUs can be requested or be assigned for retransmission. The content of each DTU may be stored in a retransmission (ReTx) queue 106 prior to being sent to a physical medium dependent (PMD) layer 109, and then transmitted over the retransmission forward channel (RFC), which is represented by the solid arrow path in FIG. 1.

It is noted that the format of the DTU may vary according to the current configuration of the single link retransmission system 100. In various embodiments, all elements that determine the structure of the DTU may be changeable through on-line reconfiguration. For example, the size of the DTU may vary based at least in part on the current data transmission rate. Also, forward error correction (FEC) parameters within each DTU may change. As a non-limiting example, the size and redundancy of the Reed-Solomon codeword used for FEC may change. That is to say, parameters controlling the number of Reed-Solomon code words and the number of redundancy octets per DTU may change.

The storage of a DTU may comprise storing at least the data content of the DTU as well as some or all ReTx specific overhead bytes in some embodiments. The transmitter 102 also receives request (ACK/NACK) messages on a retransmission return channel (RRC) represented by the dashed arrow path in FIG. 1. The received request messages, also called RRC messages, may contain information as to which DTUs have been correctly received and/or which DTUs need to be retransmitted. For improved robustness during transmission over the RCC, the request information may be coded in a specific format with a request encoder 114. Note that the request information may need to undergo decoding by the retransmission control function 115 in order to be correctly interpreted by the system 100.

A retransmission multiplexer 116 and associated logic is employed to select from either a new DTU from the DTU framer 104 or a DTU stored in the retransmission queue 106. A DTU may be retransmitted, for example, when it is not received at the receiver side 110 or received in a corrupted form at the receiver side 110. The RRC messages may indicate that the DTU is not acknowledged (i.e., a "NACK"), or may indicate that DTUs not including the missing/corrupted DTUs are acknowledged (i.e., an "ACK"). In various embodiments, the transmitter 120 may be configured to resend DTUs automatically when an acknowledgment is not received within a maximum delay constraint.

A latency path multiplexer 117 and associated logic is employed to select DTUs or overhead data for transmission. The overhead data may include, for example, embedded operations channel (EOC) data, indicator bit(s), network timing references, and/or other data. The overhead data may be multiplexed and framed before being provided to the latency path multiplexer 117. Where retransmission is enabled in both directions, the latency path multiplexer 117 may also select RRC data originating at the transmitter 102 for transmission. In various embodiments, the data provided to the latency path multiplexer 117 may be scrambled, encoded for forward error correction, and/or interleaved. Non-limiting examples of forward error correction approaches that may be employed include Reed-Solomon coding and Golay coding. The output of the latency path multiplexer 117 is a stream of mux data frames (MDF), which may also include forward error correction.

The retransmission control function 115 is employed to control the retransmission multiplexer 116 and to select DTUs for retransmission. An OLR control 119 may be implemented in association with the retransmission control function 115 such that only retransmitted DTUs are transmitted during a transitional state before the OLR takes effect. The OLR control 119 may control the DTU framer 104 and/or other components to implement a configuration change.

At the receiver side 110, each DTU is checked for errors after reception at a DTU error detector 112. Correct DTUs are then passed to a higher layer. When a DTU is corrupted or otherwise lost, a request for retransmission may be generated by a request encoder 114 and sent on the RRC. When a retransmission is in progress, correctly received DTUs may be stored locally in a rescheduling queue 120 before being passed to a higher layer. Such storage ensures a correct ordering of the data passed to the higher layer. The rescheduling queue 120 then acts as a buffer that reschedules or re-sequences DTUs received out-of-sequence. At the transmitter side 102, the PMD layer 109 modulates data sent over the RFC and demodulates data received from the RRC. At the receiver side 110, the PMD layer 111 demodulates data received from the RFC and modulates data sent over the RRC.

The effect of a change in data rate on the actual impulse noise protection of a system with retransmission is briefly described. In this discussion, it is assumed that the reference transmit state machine from the G.998.4 state machine is employed. When forward error correction and interleaving are used to provide impulse noise protection (INP), the dependency of the INP on the data rate is relatively straightforward. If the data rate is changed from $L_{p,old}$ to $L_{p,new}$ bits per symbol without adapting any of the other framing parameters, the INP changes as:

$$INP_{new} = \frac{L_{p,old}}{L_{p,new}} INP_{old} \quad (1)$$

where $INP_{new}$ is the INP after the change and $INP_{old}$ is the INP before the change.

For a system that uses retransmission, the change is less gradual and may be harder to predict—to some extent depending on the actual behavior of the transmitter state machine. When all conditions are met, the impulse noise protection provided by retransmission for an impulse noise environment with repetitive electrical impulse noise (REIN) is given by:

$$INP = \lfloor ((Nret-1) \times Q_{tx} - 1) \times S \times Q \rfloor \quad (2)$$

where $Q_{tx}$ corresponds to the length of the retransmission queue 106 in DTUs, Q corresponds to the number of Reed-Solomon code words per DTU, S corresponds to the number of Reed-Solomon code words per DMT symbol, and Nret is the maximum number of retransmissions within the maximum delay constraint. Nret is given by:

$$Nret = \left\lfloor \frac{\text{delay\_max} \times f_s}{Q_{tx} \times Q \times S} \right\rfloor \quad (3)$$

where $f_s$ corresponds to the rate of transmission of symbols in kHz, and delay_max corresponds to a maximum delay constraint.

When the data rate is decreased without modifying any of the other framing parameters (e.g., S increases), the reference transmitter state machine is unable to send all Nret retransmissions without violating the delay constraint. This means the maximum number of retransmissions decreases. At the same time however, the factor S×Q in (2) increases. When both effects are combined, the INP becomes:

$$INP = \left\lfloor \left( \left( \left\lfloor \frac{\text{delay\_max} \times f_s}{Q_{tx} \times Q \times S} \right\rfloor - 1 \right) \times Q_{tx} - 1 \right) \times S \times Q \right\rfloor \leq \quad (4)$$

$$\text{delay\_max} \times f_s - (Q_{tx} + 1) \times S \times Q$$

With decreasing L (or increasing S), the upper bound on the INP decreases, which in most cases will means a decrease in the INP itself.

When the data rate is increased, the reference state machine will still be able to send Nret retransmissions. However, the state machine could operate in at least two ways. One possibility is that the state machine keeps track of the number of retransmissions of each DTU in the transmitter FIFO. After Nret retransmissions, the DTU is removed from the memory. Another possibility is that the state machine does not explicitly keep count of the number of retransmissions. Instead, whenever a DTU becomes eligible for retransmission, the state machine checks whether the delay constraint is still met. If the delay constraint is not met, the DTU is removed from memory.

In the first case, the number of retransmissions is calculated based on the "old" (lower) data rate. Therefore, according to (2), the INP is reduced. In the second case, the INP can again be approximated by (4). Therefore, the INP actually increases. In other words, whether the INP increases or decreases with an increase in data rate depends on how the transmitter state machine has implemented G.998.4.

However, there are additional considerations to predict how the impulse noise protection will vary with a change in data rate. For the modem to be able to produce the INP calculated above, the framing parameters may need to obey a set of additional constraints, as given in, e.g., Annex I of G.998.4 (see (5)).

(i) $Nret \geq 1$ \quad (5)

(ii) $Q_{tx} \geq roundtrip_{DTU}$ (iii) $\left( \left\lceil \frac{Nret \times Q_{tx} + \text{INP\_min\_rein}}{S_1 \times Q} \right\rceil + 1 \right) \times S_1 \times Q \leq \left\lfloor \frac{k \times f_{DMT}}{f_{REIN}} \right\rfloor$ (iv) $Nret \times Q_{tx} \geq \left\lceil \left( \left\lceil \frac{(k-1) \times f_{DMT}}{f_{REIN}} + \right\rceil \right) \times \frac{1}{S_1 \times Q} \right\rceil + 1$ (v) $\left( Q_{tx} + \left\lceil \frac{\text{INP\_min\_rein}}{S_1 \times Q} \right\rceil + 1 \right) \times S_1 \times Q \leq \left\lfloor \frac{f_{DMT}}{f_{REIN}} \right\rfloor$ If any of these constraints are not met, the INP may not be guaranteed, and INP may become equal to zero. It is likely that some of the constraints in (5) will be violated after a change in data rate according to the reference state machine. In such a case, the INP will drop from its current value to zero. This looks possible for both increases and decreases in data rate.

In summary, the behavior of the impulse noise protection after a change in data rate is harder to predict for the case of a system that uses retransmission. It is clear, however, that any change in data rate should be accompanied by a change in the other relevant framing parameters to maintain the desired level of impulse noise protection.

Figure 2A:
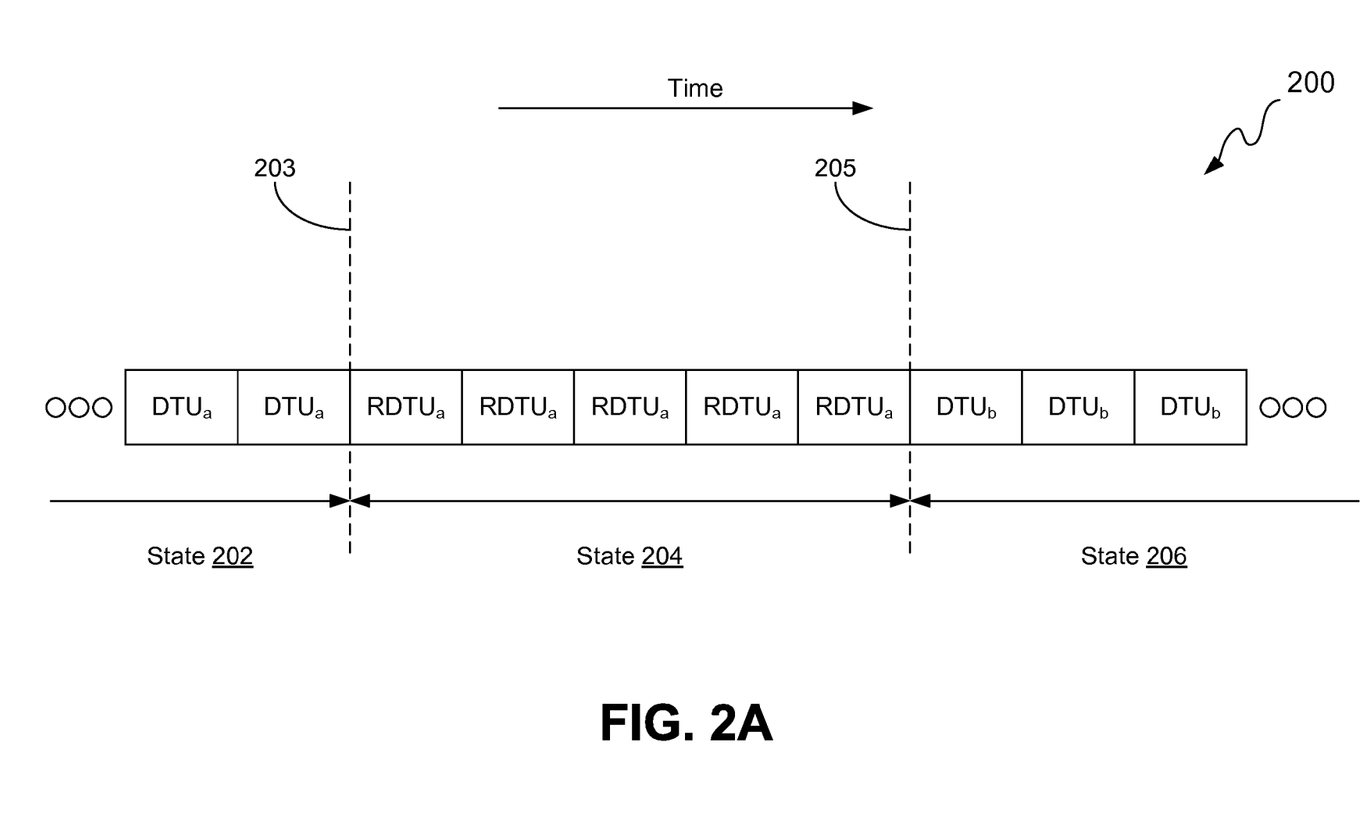
FIG. 2A is a diagram that illustrates the transmission of data in accordance with various embodiments by the transmitter of FIG. 1 over a communications channel to the receiver of FIG. 1.

With reference to FIG. 2A, shown is a diagram 200 that illustrates the operation of various embodiments of the present disclosure with respect to transmission of DTUs by the transmitter 102 (FIG. 1) over a communications channel to a receiver 110 (FIG. 1). In state 202, the transmitter 102 transmits DTUs according to a first set of framing parameters. These DTUs are each indicated as "$DTU_a$" in FIG. 2A. At some time before or equal to time 203, the transmitter 102 obtains a request for an on-line reconfiguration from the receiver 110. Such a request may be obtained from the receiver 110, for example, through an embedded operations channel (eoc).

The request for on-line reconfiguration may specify a change in various framing parameters, such as DTU size, Reed-Solomon code words per DTU, redundancy octets per Reed-Solomon codeword, and so on. The request for on-line reconfiguration may also specify changes, for example, in the data rate in bits per DMT symbol, the number of subcarriers, subcarrier parameters, the queue delay (i.e., the delay between two consecutive transmissions of the same DTU assumed by the receiver 110 specified in number of DTUs), a look back value to be used in DTU acknowledgments, the number of padding bytes per DTU, the number of MDFs per Reed-Solomon codeword, MDF size, and/or other parameters.

If the transmitter 102 accepts the on-line reconfiguration request, the transmitter 102 enters state 204 at time 203. In state 204, the transmitter 102 stops encoding data into DTUs according to the first set of framing parameters. Although not depicted in FIG. 2A, in some cases, there may be DTUs encoded according to the first set of framing parameters in various stages of processing. In such cases, the transmitter 102 may complete the processing and transmission of those DTUs to the receiver 110. At time 203, no new DTUs are generated by the DTU framer 104 according to the first set of framing parameters.

In state 204, one or more DTUs framed according to the first set of framing parameters may be retransmitted to the receiver 110. Such retransmitted DTUs are indicated as "$RDTU_a$" in FIG. 2A. The duration of the state 204 is determined in order to allow for retransmission of previously transmitted DTUs identified as $DTU_a$ that may be held in the retransmission queue 106. Such DTUs $RDTU_a$ may be retransmitted according to retransmission requests obtained from the receiver 110 through the retransmission request channel, which may correspond to acknowledgements or non-acknowledgements for various DTUs. It is noted that some DTUs $RDTU_a$ may be correctly received by the receiver 110 and even perhaps acknowledged, but the transmitter 102 may retransmit the DTUs $RDTU_a$ anyway to fill time during the state 204. Such duplicate DTUs $RDTU_a$ may be disregarded by the receiver 110.

At some time at or before time 205, the transmitter 102 sends an acknowledgement of the on-line reconfiguration request to the receiver 110. Such an acknowledgement, or indication, may signal when state 204 is to end. In various embodiments, the indication may signal that the state 204 is to end upon the transmission of a predefined number of subsequent DMT symbols. In one embodiment, the indication may signal that the state 204 is to end upon transmission of 9 subsequent DMT symbols and that the state 206 is to take effect upon the 10th subsequent DMT symbol. In another embodiment, the indication may signal that the state 206 takes effect starting from the $66^{th}$ DMT symbol following the indication. In yet another embodiment, the indication may signal that the state 206 takes effect starting with the next DMT symbol. It is understood that any number of DMT symbols may be used that is agreed upon by the transmitter 102 and the receiver 110. In still other embodiments, the number of DMT symbols may be explicitly specified by the transmitter 102.

At some time at or before time 205, the DTU framer 104 resumes framing the data stream into DTUs, now according to the framing parameters changed as a result of the on-line reconfiguration. The DTUs framed according to the modified framing parameters are not transmitted during state 204. At time 205, the transmitter 102 changes from state 204 to state 206. In state 206, the transmitter 102 begins transmitting new DTUs that are framed according to the changed framing parameters. These new DTUs are indicated as "$DTU_b$" in FIG. 2A and may differ in size, number of FEC code words, redundancy of FEC code words, and/or other parameters in comparison to the DTUs $DTU_a$ and $RDTU_a$.

Note that the transmitter 102 no longer responds to retransmission requests for DTUs $DTU_a$ during state 206. Thus, it is important to select the duration of the state 204 so that possible retransmission requests for DTUs $DTU_a$ are likely to be accommodated. Meanwhile, it may be desirable to minimize the duration of the state 204 to reduce latency.

In various embodiments, the duration of the state 204 is a configurable parameter. The duration of state 204 when no new DTUs are transmitted should be considered carefully. No new data can be transmitted during state 204, so it should be kept as short as practical. However, in case the receiver 110 has a high number of unacknowledged DTUs, the number of retransmissions during this period should be high enough to reasonably allow the receiver 110 to correct corrupted DTUs. For example, the duration of the state 204 may be selected to be just enough to satisfy a minimum level of impulse noise protection. The duration of the state 204 may be determined based at least in part on, for example, a maximum number of retransmissions, a maximum delay constraint, and/or a size of the retransmission queue 106 of the transmitter 102. Impulse noise protection is consequently provided in states 202, 204, and 206. As long as there are no outstanding retransmission requests at the receiver 110 when state 206 is entered, there should be no errors in the on-line reconfiguration procedure and impulse noise protection is provided throughout.

Figure 2B:
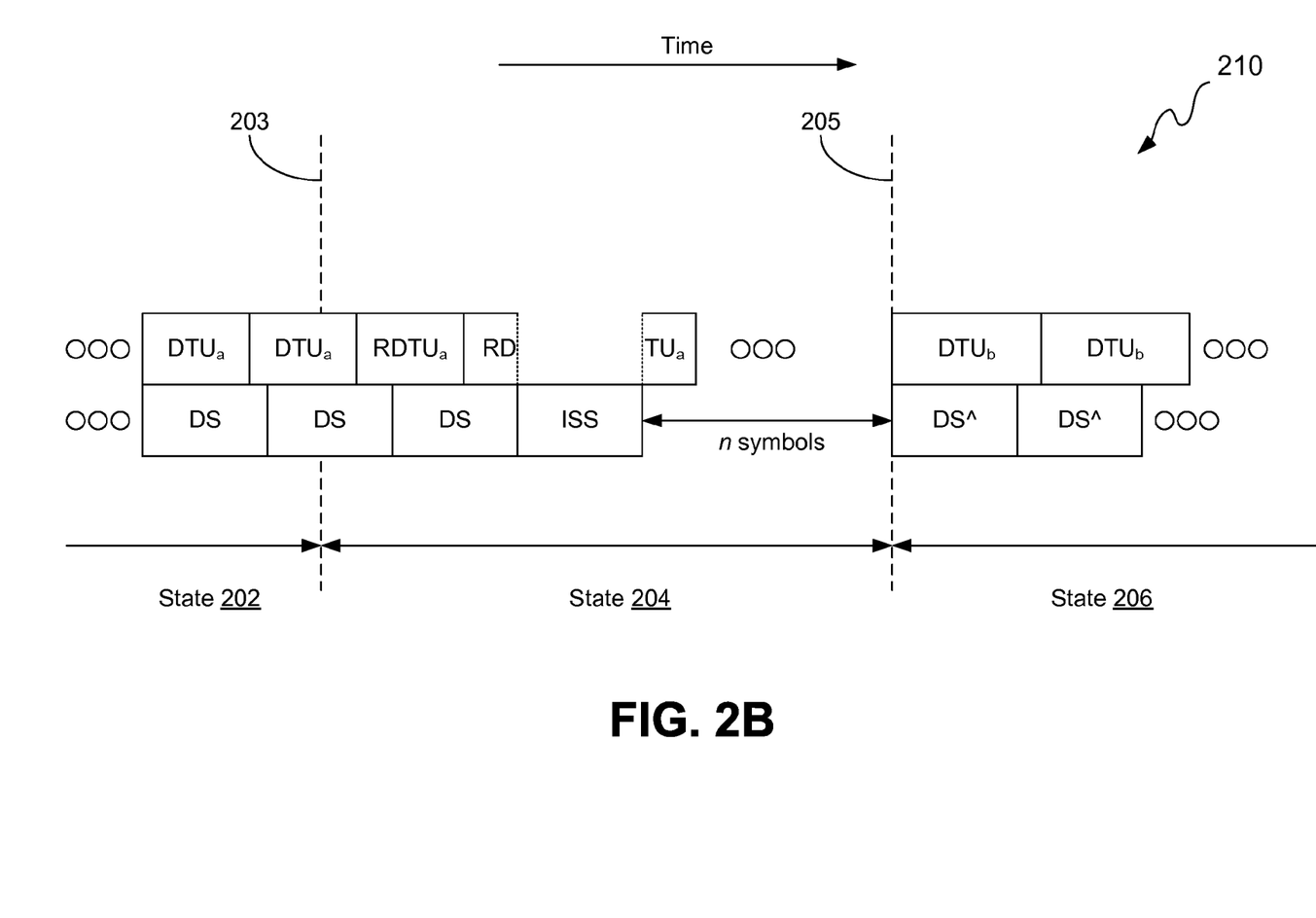
FIG. 2B is a diagram that illustrates the transmission of data in accordance with various embodiments by the transmitter of FIG. 1 over a communications channel to the receiver of FIG. 1 as related to discrete multi-tone symbols.

Turning now to FIG. 2B, shown is a diagram 210 that illustrates the transmission of DTUs in accordance with various embodiments by the transmitter 102 over a communications channel to a receiver 110 as related in time to DMT symbols. In FIG. 2B, the DMT symbols corresponding to a data rate employed during states 202 and 204 are indicated by "DS." According to the G.998.4 recommendation, a DTU may correspond to a number between 0.5 and 4. Thus, DTUs $DTU_a$ may not be exactly aligned with DMT symbols DS. To illustrate, time 203 is shown in FIG. 2B as not being aligned on a DTU or DMT symbol boundary.

The indication of acceptance of the on-line reconfiguration request, which may be used by the receiver 110 to determine time 205, may correspond to an inverted sync symbol, depicted in FIG. 2B as "ISS." This synchronization flag may indicate a number n of symbols until the on-line reconfiguration is executed. As a non-limiting example, n may be a number previously agreed upon by the transmitter 102 and the receiver 110, such as, e.g., 9, 65, or some other number. As illustrated in FIG. 2B, transmission of the current $RDTU_a$ is suspended while the inverted sync symbol is transmitted and resumed upon the next DMT symbol DS.

When the on-line reconfiguration is executed, the data rate changes to a different data rate and DMT symbols consistent with the different data rate are employed. These DMT symbols are indicated as "DS'" in FIG. 2B. As seen in FIG. 2B, the change in data rate and framing parameters may be aligned. Thus, time 205 may correspond to a DTU boundary and a DTU symbol boundary, with the beginning of the first DTU $DTU_b$ being aligned with the beginning of the first DMT symbol DŜ. In practice, the change in framing parameters and the change in data rate may not occur simultaneously. The first DTU boundary after the beginning of the first DMT symbol DŜ with the modified data rate may be the first DTU $DTU_b$ that is encoded using the modified framing parameters. Alternatively, the transmission of the DTUs may be configured to be reset upon the data rate change, thereby possibly truncating transmission of the last DTU $RDTU_a$, to ensure that the start of the first DTU $DTU_b$ is aligned with the start of the first DMT symbol DŜ.

The way in which the impulse noise protection changes when only the data rate changes is not easily predictable. For that reason, it is desirable to keep changes to the data rate (e.g., bits per DMT symbol) and changes to the framing parameters (e.g., Reed-Solomon code words) as close as possible. Because G.998.4 specifies that the number of DMT symbols per DTU is between 0.5 and 4, the time between the boundary of a DMT symbol and the closest DTU boundary may be within a well-defined range.

Figure 3:
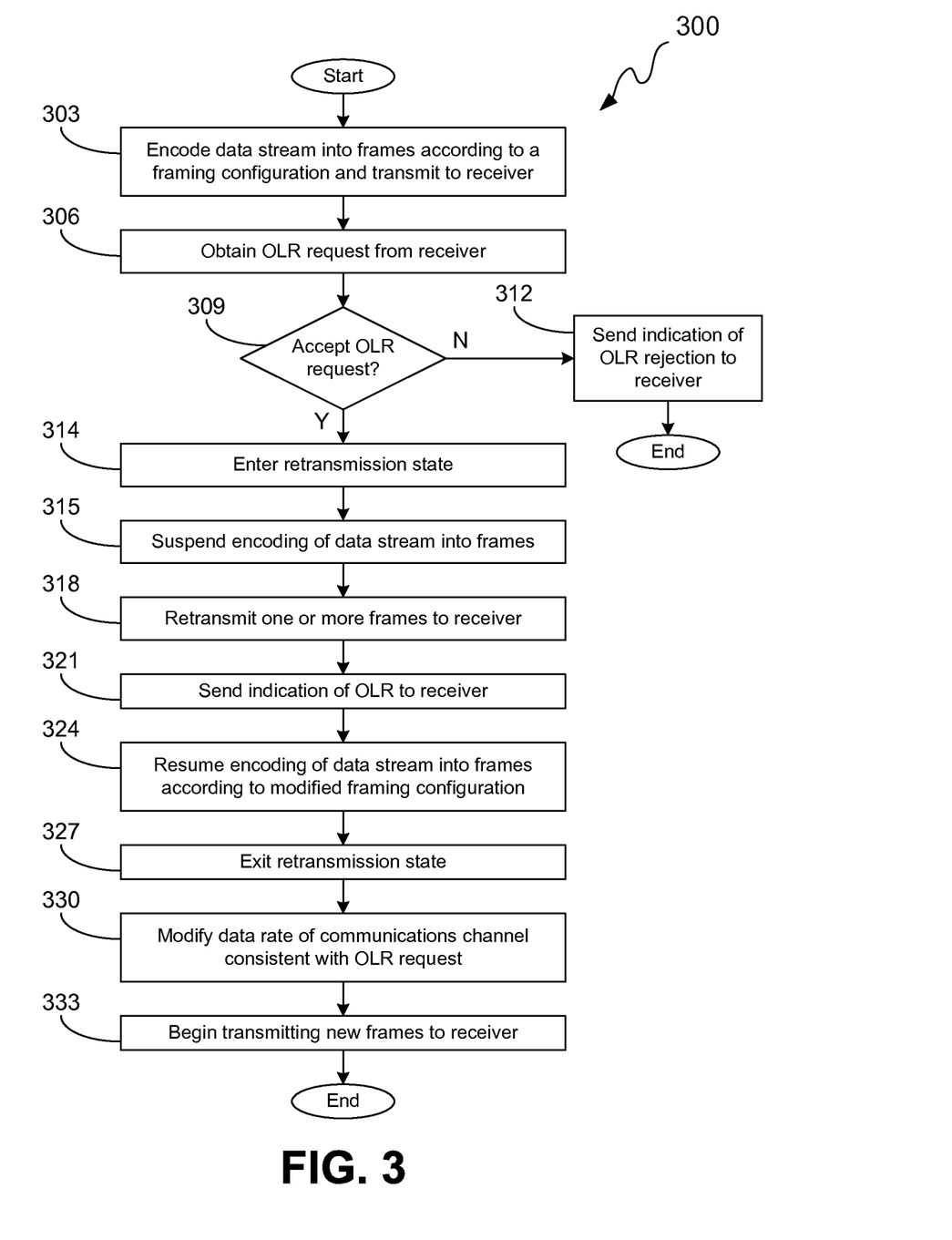
FIG. 3 is a flow diagram in accordance with one embodiment for performing retransmission with on-line reconfiguration in the transmitter of FIG. 1.

Moving on to FIG. 3, shown is a flow diagram 300 for an embodiment for retransmission with on-line reconfiguration (OLR) performed as implemented in the transmitter 102 of FIG. 1. Beginning with box 303, the DTU framer 104 of the transmitter 102 encodes a data stream into a plurality of first frames according to a framing configuration. The transmitter 102 transmits the first frames to the receiver 110 over a communication channel, such as a DSL channel, that employs DMT modulation. The transmission is performed at a first data rate, which determines how much data is transmitted per DMT symbol.

In box 306, the transmitter 102 obtains an OLR request from the receiver 110. For example, the OLR request may be obtained from the receiver 110 through an embedded operations channel. The OLR request may specify, for example, that the data rate of the communications channel be changed, that FEC codeword frequency be changed, that redundancy for the FEC code words be changed, and so on. In box 309, the transmitter 102 determines whether to accept the OLR request. If the transmitter 102 does not accept the OLR request, the transmitter 102 continues to box 312 and sends an indication of an OLR request rejection (e.g., a "NACK") to the receiver 110 through the embedded operations channel. Thereafter, the functionality of the transmitter 102 described in flow diagram 300 ends, and no OLR is performed.

Alternatively, referring back to box 309, if the transmitter 102 accepts the OLR request, the transmitter 102 continues to box 314. In box 314, the transmitter 102 enters a retransmission state. During the retransmission state, no new frames are generated from the data stream, and only frames in the retransmission queue 106 may be retransmitted. The duration of the retransmission state is selected such that it is likely that any retransmission requests for previously transmitted frames will be accommodated. In box 315, the transmitter 102 suspends encoding of the data stream by the DTU framer 104 into the frames according to the framing configuration.

In box 318, the transmitter 102 retransmits one or more of the frames to the receiver 110. The remaining frames in the retransmission queue 106 are selected by the retransmission multiplexer 116 for retransmission. In some cases, such retransmissions may be the result of the transmitter 102 obtaining retransmission requests from the receiver 102. In other cases, such retransmissions may be the result of the transmitter 102 obtaining an acknowledgement of frames that implicitly indicate that one or more frames were not received. In still other cases, such retransmissions may be of frames that were correctly received by the receiver 110 merely to fill the duration of the retransmission state or time period.

In box 321, the transmitter 102 sends an indication or acknowledgement of the OLR request to the receiver 110. Such an indication may be in the form of a sync flag, an inverted sync symbol, and/or any other symbol agreed upon by the transmitter 102 and the receiver 110. The indication signals when the retransmission state is to end and when the OLR is to take effect. In various embodiments, it may be agreed upon by the transmitter 102 and the receiver 110 that the OLR is to take effect after a predefined number of subsequent DMT symbols are transmitted, e.g., after 0 symbols, 10 symbols, 65 symbols, or some other number of DMT symbols.

In box 324, the DTU framer 104 resumes encoding of the data stream into frames according to a modified framing configuration that is consistent with the OLR. However, it is noted that no frames, or DTUs, encoded according to the modified framing configuration are transmitted during the retransmission state. In box 327, the transmitter 102 exits the retransmission state. In box 330, the transmitter 102 modifies the data rate of the communications channel consistent with the OLR request. In box 333, the transmitter 102 begins transmitting the new frames to the receiver 110. The first one of the new frames corresponds to the first DTU boundary of the first DMT symbol at the modified data rate. Subsequently, the transmitter 102 is unable to retransmit any of the previously transmitted frames according to the previous configuration. Thereafter, the functionality of the transmitter 102 described in flow diagram 300 ends, thereby completing retransmission with OLR.

Figure 4:
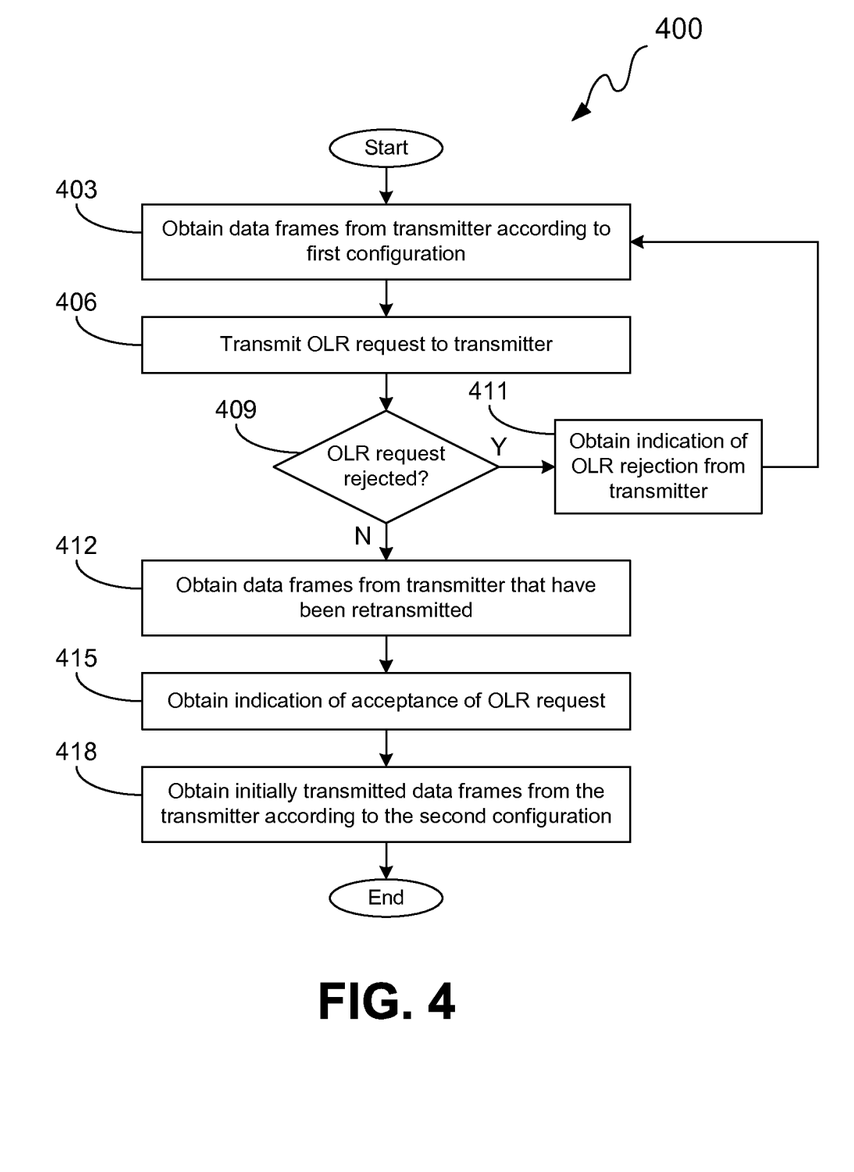
FIG. 4 is a flow diagram in accordance with one embodiment for performing retransmission with on-line reconfiguration in the receiver of FIG. 1.

Moving on to FIG. 4, shown is a flow diagram 400 for an embodiment for performing retransmission with on-line reconfiguration (OLR) in the receiver 110 of FIG. 1. Beginning with box 403, the receiver 110 obtains one or more data frames from the transmitter 102 according to a first configuration. In box 406, the receiver 110 transmits an OLR request to the transmitter 102. In box 409, the receiver 110 determines whether the OLR request has been rejected. If the OLR request has been rejected, in box 411, the receiver 110 obtains an indication of the OLR rejection from the transmitter 102 through, for example, the embedded operations channel (eoc). The receiver 110 then returns to box 403 and continues to obtain data frames from the transmitter 102 according to the first configuration.

Referring back to box 409, if the OLR request has not been rejected, the receiver 110 moves to box 412 and obtains one or more data frames from the transmitter 102 that have been retransmitted. In box 415, the receiver 110 obtains an indication of an acceptance of the OLR request. In various embodiments, retransmitted frames may be received before and/or after the indication of the acceptance. The indication of acceptance also signals to the receiver 110 when the OLR will take effect.

In box 418, the OLR takes effect and the receiver 110 obtains initially transmitted data frames from the transmitter 102 according to the second configuration. Thereafter, the functionality of the receiver 110 described in flow diagram 400 ends, thereby completing retransmission with OLR. It is noted that no retransmitted frames according to the first configuration are obtained following the OLR taking effect. Further, during a period of time beginning at or after the OLR request is sent and ending when the OLR takes effect, no initially transmitted frames are sent by the transmitter 102.

Figure 5:
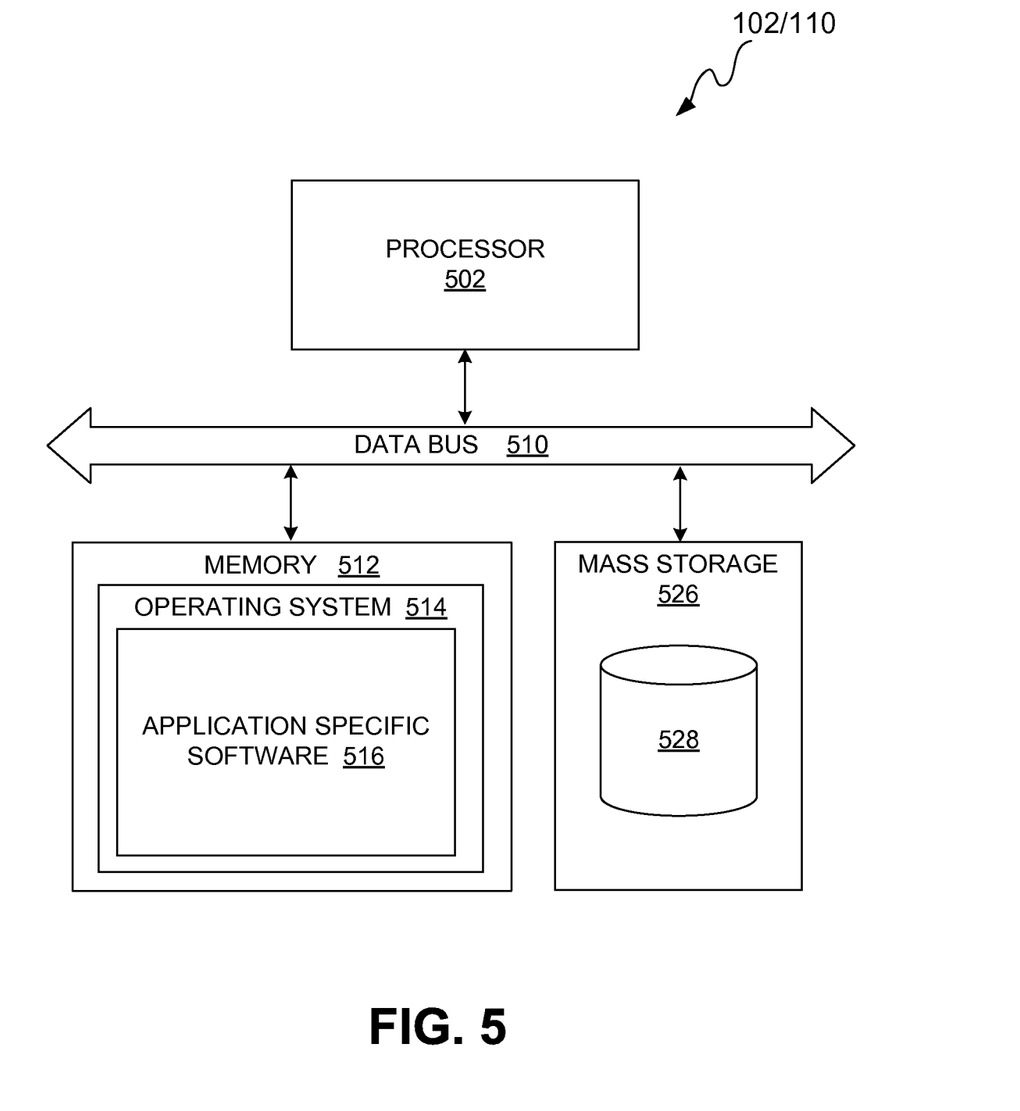
FIG. 5 illustrates an embodiment of an apparatus for executing the transmitter and/or receiver in FIG. 1.

FIG. 5 illustrates an embodiment of an apparatus for executing, for example, the transmitter 102 and/or the receiver 110 shown in FIG. 1. Generally speaking, the various embodiments for performing retransmission with on-line reconfiguration may be implemented in any one of a number of computing devices. Regardless of its specific arrangement, the system 100 in FIG. 1 may comprise memory 512, a processor 502, and mass storage 526, wherein each of these devices are connected across a data bus 510.

The processor 502 may include any custom made or commercially available processor, a central processing unit (CPU) or an auxiliary processor among several processors associated with the retransmission system 100, a semiconductor based microprocessor (in the form of a microchip), one or more application specific integrated circuits (ASICs), one or more field programmable gate arrays (FPGAs), a plurality of suitably configured digital logic gates, and other well known electrical configurations comprising discrete elements both individually and in various combinations to coordinate the overall operation of the computing system.

The memory 512 can include any one or a combination of volatile memory elements (e.g., random-access memory (RAM, such as DRAM, and SRAM, etc.)) and nonvolatile memory elements (e.g., ROM, hard drive, CDROM, etc.). The memory 512 typically comprises a native operating system 514, one or more native applications, emulation systems, or emulated applications for any of a variety of operating systems and/or emulated hardware platforms, emulated operating systems, etc. For example, the applications may include application specific software 516 stored on a computer readable medium and executed by the processor 502 and may include any of the components described with respect to FIG. 1. One of ordinary skill in the art will appreciate that the memory 512 can, and typically will, comprise other components which have been omitted for purposes of brevity. It should be noted, however, that the various components in FIG. 1 may also be embodied as hardware.

Where any of the components described above comprises software or code, these components are embodied in a non-transitory computer-readable medium for use by or in connection with an instruction execution system such as, for example, a processor in a computer system or other system. In the context of the present disclosure, a computer-readable medium refers to any tangible medium that can contain, store, or maintain the software or code for use by or in connection with an instruction execution system. For example, a computer-readable medium may store one or more programs for execution by the processing device 502 described above.

More specific examples of the computer-readable medium may include a portable computer diskette, a random access memory (RAM), a read-only memory (ROM), an erasable programmable read-only memory (EPROM, EEPROM, or Flash memory), and a portable compact disc read-only memory (CDROM). As shown in FIG. 6, the retransmission system 100 may further comprise mass storage 526. For some embodiments, the mass storage 526 may include a database 528 for storing and managing data, such as bit-loading tables.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in a transmitter of a digital subscriber line (DSL) system, comprising the steps of:
   encoding a data stream into a plurality of first frames according to a framing configuration;
   obtaining a request for an on-line reconfiguration of the framing configuration from a receiver;
   suspending the encoding of the data stream into the first frames in response to the request;
   retransmitting at least one of the first frames to the receiver during a retransmission time period that occurs simultaneously with the suspending of the encoding of the data stream into the first frames;
   resuming the encoding of the data stream into a plurality of second frames according to a modified framing configuration consistent with the on-line reconfiguration; and
   transmitting the second frames to the receiver upon expiration of the retransmission time period.

2. The method of claim 1, further comprising the step of obtaining acknowledgement data from the receiver through a retransmission return channel, wherein the at least one of the first frames are retransmitted in response to the acknowledgement data.

3. The method of claim 1, wherein the retransmission time period is based at least in part on a size of a retransmission queue of the transmitter.

4. The method of claim 1, wherein the retransmission time period is based at least in part on a parameter that establishes a minimum level of impulse noise protection for a transmission channel between the transmitter and the receiver.

5. The method of claim 1, wherein the at least one of the first frames are retransmitted using at least one discrete multi-tone (DMT) symbol associated with a first data rate, and the second frames are transmitted using at least one DMT symbol associated with a second data rate that is different from the first data rate.

6. The method of claim 1, further comprising the step of transmitting an indication of when the retransmission time period expires to the receiver.

7. The method of claim 6, wherein the indication corresponds to an inverted sync symbol.

8. The method of claim 6, wherein the indication signals that the retransmission time period expires after a predefined number of discrete multi-tone (DMT) symbols are transmitted.

9. The method of claim 8, wherein the predefined number of DMT symbols is nine DMT symbols, and the on-line reconfiguration takes effect upon a tenth DMT symbol after the indication.

10. The method of claim 1, wherein the request for the on-line reconfiguration specifies a modified data rate to be employed by the transmitter in transmitting data to the receiver.

11. The method of claim 1, wherein the framing configuration specifies a frame size for the first frames, and the modified framing configuration specifies a different frame size for the second frames.

12. The method of claim 1, wherein the framing configuration specifies a forward error correction configuration for the first frames, and the modified framing configuration specifies a different forward error correction configuration for the second frames.

13. The method of claim 12, wherein the forward error correction configuration specifies a number of code words per frame for Reed-Solomon encoding, and the different forward error correction configuration specifies a different number of code words per frame for Reed-Solomon encoding.

14. The method of claim 12, wherein the forward error correction configuration specifies a level of redundancy for code words employed in Reed-Solomon encoding, and the different forward error correction configuration specifies a different level of redundancy for code words employed in Reed-Solomon encoding.

15. A system, comprising:
a transmitter for transmitting a data stream over a communications channel to a receiver, the transmitter comprising:
a framing encoder configured to encode the data stream into a plurality of frames according to a framing configuration; and
reconfiguration logic that performs an on-line reconfiguration of the communications channel, the reconfiguration logic comprising:
logic that suspends operation of the framing encoder according to the framing configuration;
logic that enables retransmission of at least one of the frames encoded according to the framing configuration during a retransmission state that occurs simultaneously with the operation of the framing encoder being suspended;
logic that resumes operation of the framing encoder according to a modified framing configuration consistent with the on-line reconfiguration; and
logic that disables transmission of frames encoded according to the modified framing configuration until the retransmission state ends.

16. The system of claim 15, wherein the transmitter further comprises a modulator configured to modulate the frames to at least one tone forming a discrete multi-tone (DMT) symbol according to a data rate, and wherein the reconfiguration logic further comprises logic that reconfigures the modulator to employ a different data rate consistent with the on-line reconfiguration upon ending of the retransmission state.

17. The system of claim 15, wherein the communication channel comprises a digital subscriber line (DSL) channel.

18. The system of claim 15, wherein the reconfiguration logic further comprises logic that obtains a request to perform the on-line reconfiguration from the receiver, wherein the on-line reconfiguration is performed in response to the request.

19. The system of claim 18, wherein the reconfiguration logic further comprises:
logic that determines whether to reject the request to perform the on-line reconfiguration; and
logic that transmits a notification to the receiver when the request is rejected.

20. The system of claim 15, wherein the on-line reconfiguration modifies a data rate of the communications channel.

21. The system of claim 15, wherein a duration of the retransmission state is determined based at least in part on a maximum number of retransmissions and a length of a retransmission queue.

22. The system of claim 15, wherein the reconfiguration logic further comprises logic that transmits a reconfiguration completion indication to the receiver that indicates when the retransmission state ends.

23. The system of claim 22, wherein the reconfiguration completion indication signals that the retransmission state ends after a predefined number of discrete multi-tone (DMT) symbols are transmitted.

24. A system, comprising: a receiver for receiving a data stream over a communications channel from a transmitter, the receiver comprising:
logic that transmits a request for an on-line reconfiguration of the communications channel to the transmitter;
logic that obtains at least one retransmitted frame of the data stream from the transmitter after the request is transmitted, the at least one retransmitted frame being framed according to a first framing configuration;
logic that obtains an indication that signals that the on-line reconfiguration is to take effect in a predefined number of discrete multi-tone (DMT) symbols, wherein no initially transmitted frames of the data stream are obtained before the on-line reconfiguration takes effect after obtaining the indication; and
logic that obtains at least one frame of the data stream from the transmitter when the on-line reconfiguration takes effect, the at least one frame being framed according to a second framing configuration that is consistent with the on-line reconfiguration.

25. The system of claim 24, wherein the on-line reconfiguration modifies a data rate of the communications channel.

26. The system of claim 24, wherein the receiver further comprises a demodulator configured to demodulate at least one tone forming a discrete multi-tone (DMT) symbol into frames of the data stream.

27. The system of claim 24, wherein the receiver further comprises logic that sends a request for retransmission of at least one frame of the data stream to the transmitter.

* * * * *